(12) United States Patent
Chiu et al.

(10) Patent No.: US 7,521,882 B2
(45) Date of Patent: Apr. 21, 2009

(54) CONTROL DEVICE AND METHOD OF MOTOR

(75) Inventors: Chin-Fa Chiu, Taoyuan Hsien (TW);
Chun-Lung Chiu, Taoyuan Hsien (TW);
Ming-Shi Tsai, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 185 days.

(21) Appl. No.: 11/589,195

(22) Filed: Oct. 30, 2006

(65) Prior Publication Data

US 2007/0147805 A1    Jun. 28, 2007

(30) Foreign Application Priority Data

Nov. 4, 2005    (TW) .............................. 94138662 A

(51) Int. Cl.
*H02P 1/00*    (2006.01)
(52) U.S. Cl. .................. 318/139; 318/727; 318/772
(58) Field of Classification Search ................. 318/139, 318/727, 772, 430, 432, 434, 439, 599, 811, 318/400.04
See application file for complete search history.

(56) References Cited

U.S. PATENT DOCUMENTS 6,933,690 B2 *   8/2005   Yamamoto ............. 318/400.04
2005/0177344 A1 *   8/2005   Khaleel ...................... 702/186

FOREIGN PATENT DOCUMENTS

CN    1684354 A    10/2004
CN    1625042 A    6/2005

* cited by examiner

*Primary Examiner*—Karen Masih
(74) *Attorney, Agent, or Firm*—Birch, Stewart, Kolasch & Birch, LLP

(57) ABSTRACT

A control device for controlling a motor includes a sensing module, a modifying module and a driving module. The sensing module senses the motor to generate a sensing signal. The modifying module receives the sensing signal and generates a phase modifying signal according to the sensing signal. The driving module receives the phase modifying signal and generates a driving current to drive the motor according to the phase modifying signal.

17 Claims, 4 Drawing Sheets

CONTROL DEVICE AND METHOD OF MOTOR

CROSS REFERENCE TO RELATED APPLICATIONS

This Non-provisional application claims priority under 35 U.S.C. §119(a) on Patent Application No(s). 094138662 filed in Taiwan, Republic of China on Nov. 4, 2005, the entire contents of which are hereby incorporated by reference.

BACKGROUND OF THE INVENTION

1. Field of Invention

The invention relates to a control device and a control method, and, in particular, to a control device and a control method of a motor.

2. Related Art

A Hall element can sense a position of a magnetic pole of a motor. Thus, the Hall element can be properly disposed in a motor control device to monitor the rotation of the motor.

As shown in FIGS. 1 and 2, a Hall element 11 is disposed at a position $P_1$ to sense changes of a magnetic pole of a DC brushless motor 12 when the motor 12 rotates, and a controller 13 modifies a driving current 121 for driving the DC brushless motor 12 according to a sensing result of the Hall element 11.

However, when the rotating speed of the DC brushless motor 12 increases and if the Hall element 11 is still placed at the position $P_1$, the driving current 121 may have a surge (FIG. 2) near a reverse point, and the phase of the driving current 121 also lags behind the driving voltage of the DC brushless motor 12. Thus, the motor generates the noise during operation and the motor may operate with a poor efficiency. Consequently, the Hall element 11 may be placed at a position $P_2$ according to another prior art. In this case, the phase difference between the driving current 121 and the driving voltage and the condition of generating the surge easily near the reverse point of the driving current 121 can be improved when the DC brushless motor 12 is operating at a high speed. Thus, the noise of the DC brushless motor 12 can be decreased and the operating efficiency can be enhanced. However, the DC brushless motor 12 operating at a low speed may have poor efficiency and louder noise. Consequently, when the DC brushless motor 12 is operating at different rotating speeds, the position $P_1$, the position $P_2$ or any other optimum placing position, where the Hall element 11 is placed, corresponding to other rotating speeds may influence the efficiency of the controller 13 for controlling the DC brushless motor 12.

Thus, it is an important subject of the invention to provide a device and a method for controlling a motor, which are free from being influenced by a placing position of a sensor while the rotating speed of the motor changes. Furthermore, when the rotating speed of the motor changes, the device and method for controlling the motor can response with the rotating speed to generate a proper motor driving current so as to enhance the working efficiency, lengthen the lifetime of the motor and reduce the noise of the operating motor.

SUMMARY OF THE INVENTION

In view of the foregoing, the invention is to provide a control device of a motor and a method for controlling the motor, which are free from being influenced by a placing position of a sensor as the rotating speed of the motor changes.

To achieve the above, a control device for controlling a motor of the invention includes a sensing module, a modifying module and a driving module. The sensing module senses the motor to generate a sensing signal. The modifying module receives the sensing signal and generates a phase modifying signal according to the sensing signal. The driving module receives the phase modifying signal and generates a driving current to drive the motor according to the phase modifying signal.

To achieve the above, the invention discloses a method for controlling a motor, which includes the steps of: sensing the motor to generate a sensing signal, generating a phase modifying signal according to the sensing signal, and generating a driving current to drive the motor according to the phase modifying signal.

In addition, the invention also discloses a control device for controlling a motor. The control device includes a sensing module, a shifting module, a modifying module and a driving module. The sensing module senses the motor to generate a sensing signal. The shifting module receives the sensing signal and generates a phase shift value according to the sensing signal. The modifying module receives the sensing signal and the phase shift value and generates a phase modifying signal according to the sensing signal and the phase shift value. The driving module receives the phase modifying signal and generates a driving current to drive the motor according to the phase modifying signal.

To achieve the above, the invention further discloses a method for controlling a motor, which includes the steps of: sensing the motor to generate a sensing signal, generating a phase shift value according to the sensing signal, generating a phase modifying signal according to the sensing signal and the phase shift value, and generating a driving current to drive the motor according to the phase modifying signal.

As mentioned above, the motor control device and method of the invention generate a phase modifying signal according to the sensing signal and generate a driving current to drive the motor according to the phase modifying signal. Therefore, when the rotating speed of the motor changes, the device and method can response with the influence of the placing position of the sensor, and response with the rotating speed to generate a proper motor driving current so as to enhance the working efficiency, lengthen the lifetime of the motor and reduce the noise generated when the motor is operating.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 3:
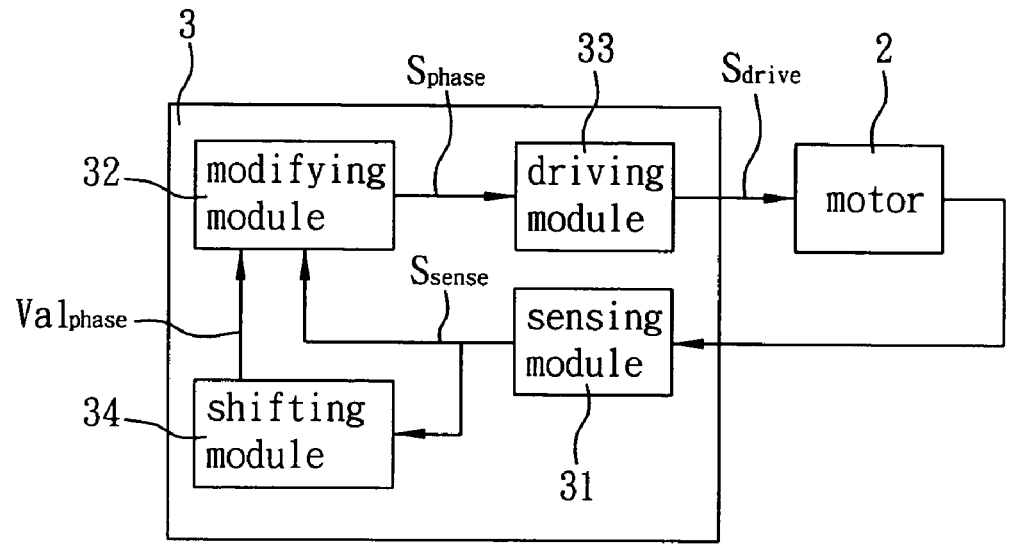
FIG. 3 is a block diagram showing a control device of a motor according to a preferred embodiment of the invention.

Referring to FIG. 3, a control device 3 of a motor 2 according to a preferred embodiment of the invention includes a sensing module 31, a modifying module 32 and a driving module 33.

The sensing module 31 senses a position of a magnetic pole of the motor 2, an operating current of the motor and/or a rotating speed of the motor to generate a sensing signal $S_{sense}$. The modifying module 32 receives the sensing signal $S_{sense}$ and generates a phase modifying signal $S_{phase}$ according to the sensing signal $S_{sense}$. The driving module 33 receives the phase modifying signal $S_{phase}$, and generates a driving current $S_{drive}$ to drive the motor 2 according to the phase modifying signal $S_{phase}$.

Figure 1:
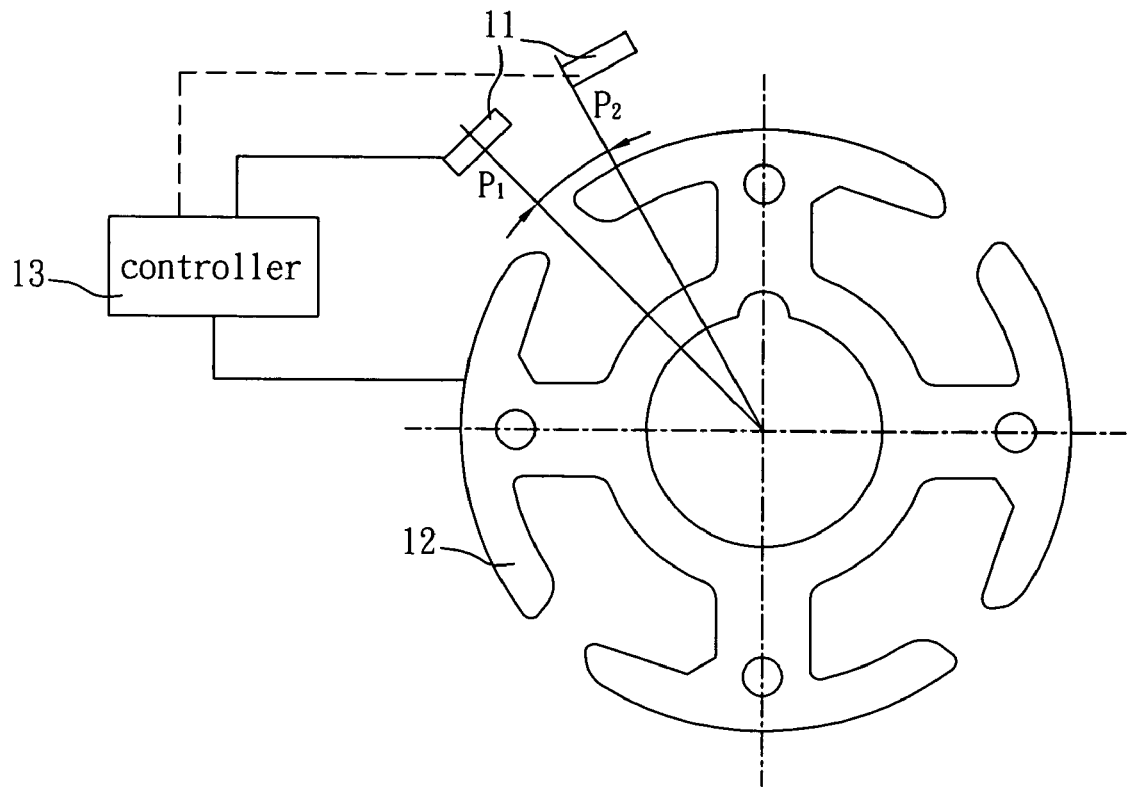
FIG. 1 is a schematic illustration showing placing positions of a Hall element in a conventional motor.
Figure 2:
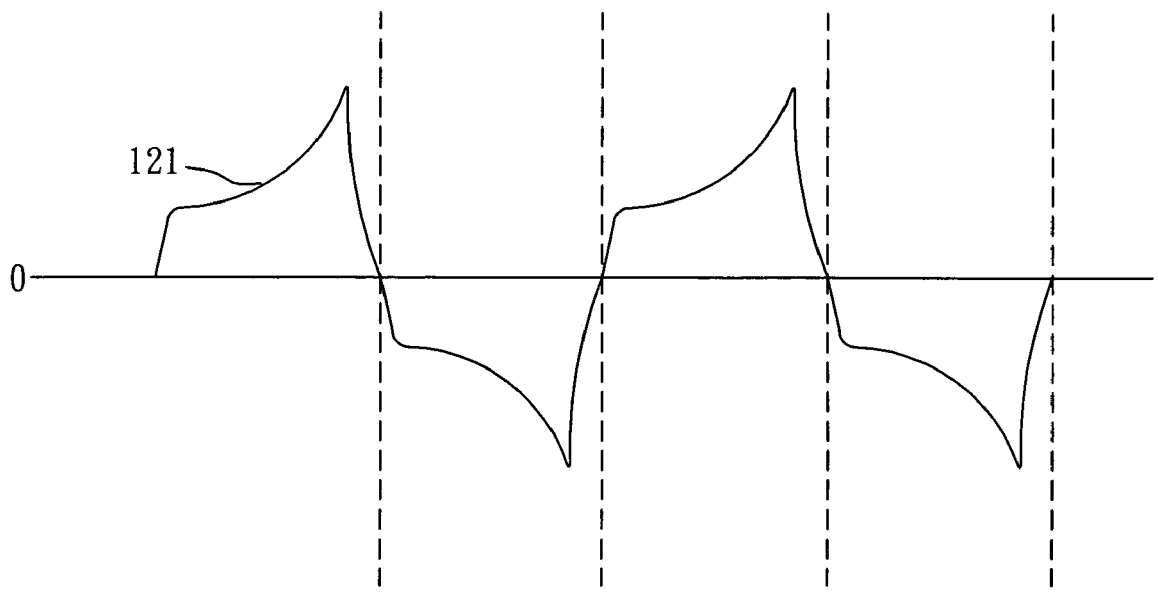
FIG. 2 is a schematic illustration showing a driving current of the conventional motor.
Figure 4:
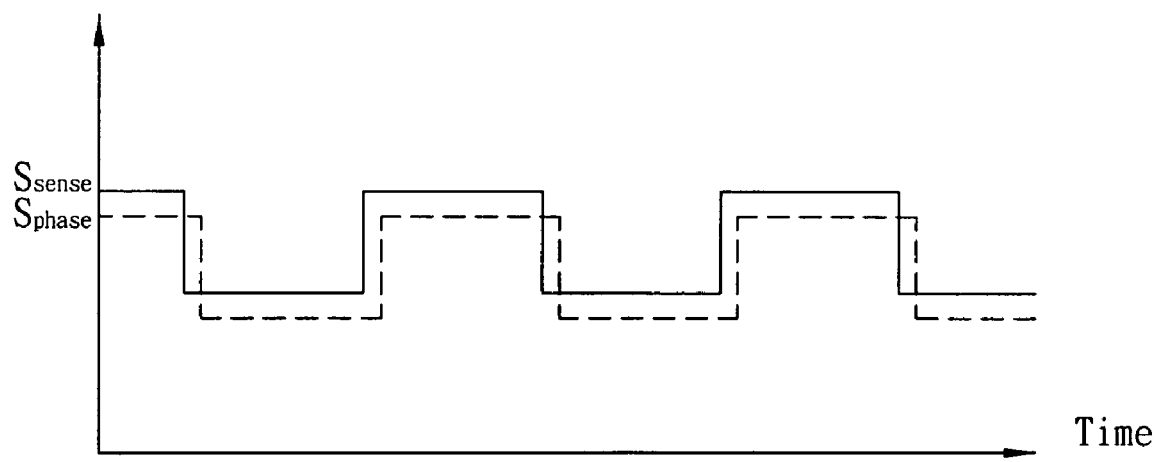
FIG. 4 is a schematic illustration showing a sensing signal in the control device of the motor according to the preferred embodiment of the invention.
Figure 5:
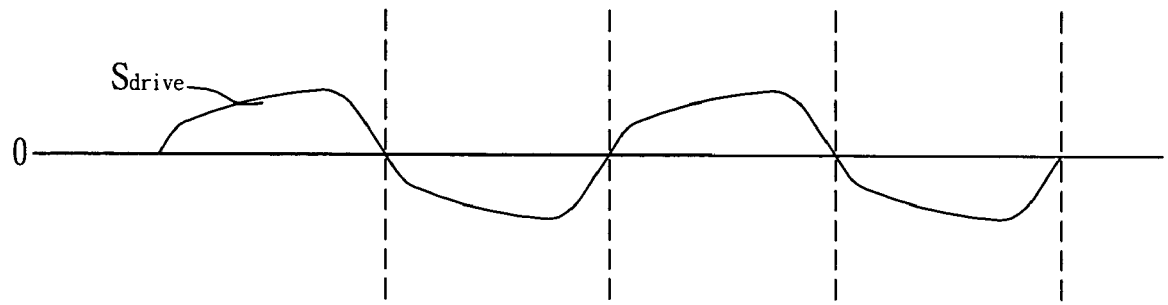
FIG. 5 is a schematic illustration showing a driving current in the control device of the motor according to the preferred embodiment of the invention.

As shown in FIGS. 3 to 5, the sensing module 31 may include a Hall element (not shown), which senses the position of the magnetic pole of the motor 2 to generate the sensing signal $S_{sense}$. The modifying module 32 and the driving module 33 may be integrated in a controller. The modifying module 32 of the controller properly modifies the sensing signal $S_{sense}$ into the phase modifying signal $S_{phase}$, as shown in FIG. 4. The phase difference between the sensing signal $S_{sense}$ and the phase modifying signal $S_{phase}$ is to simulate the position (e.g., position $P_1$ or $P_2$ of FIG. 1) at which the Hall element corresponding to the rotating speed is placed in the motor. The driving current $S_{drive}$ has no obvious surge near the reverse point, as shown in FIG. 5.

Thus, the Hall element is placed at a fixed position. When the optimum sensing position of the motor 2 changes due to the change of the rotating speed, the Hall element can simulate the condition of sensing the motor 2 at a better sensing position after the modifying module 32 properly modifies the sensing signal $S_{sense}$ into the phase modifying signal $S_{phase}$ although the Hall element senses the motor 2 at the originally fixed position.

In addition, the sensing module 31 may include a current sensor or a rotating speed sensor to replace the Hall element. The current sensor or the rotating speed sensor senses the operating current or the rotating speed of the motor to generate the sensing signal.

The control device 3 further includes a shifting module 34 for receiving the sensing signal $S_{sense}$ and generating a phase shift value $Val_{phase}$ according to sensing signal $S_{sense}$. The phase shift value $Val_{phase}$ is transmitted to the modifying module 32, which generates the phase modifying signal $S_{phase}$ according to the sensing signal $S_{sense}$ and the phase shift value $Val_{phase}$. The phase difference between the phase modifying signal $S_{phase}$ and the sensing signal $S_{sense}$ is equal to the phase difference represented by the phase shift value $Val_{phase}$. Thus, the shifting module 34 can dynamically modify the value to enable the modifying module 32 to modify the phase and to obtain the better simulation effect according to the actual rotating speed of the motor 2. In addition, the shifting module 34, the modifying module 32 and the driving module 33 may be integrated in the same controller.

In the embodiment, the controller may be a programmable chip, an integrated circuit, a processor, a digital signal processor or a micro-controller, and the shifting module 34, the modifying module 32 and the driving module 33 may be firmware program codes.

In this embodiment, the shifting module 34 may include a table or an equation corresponding to the relationship between the sensing signal $S_{sense}$ and the phase shift value $Val_{phase}$. Thus, when the shifting module 34 is operating, the phase shift value $Val_{phase}$ may be derived from the table or equation corresponding to the relationship. The phase shift value $Val_{phase}$ may be an angle between a position, at which the sensing module 31 is placed in the motor, and an optimum sensing position corresponding to the rotating speed. Herein, the angle may be, for example, the arc angle between the positions $P_1$ and $P_2$ in FIG. 1.

The modifying module 32 generates the phase modifying signal $S_{phase}$. In the embodiment, the phase difference between the phase modifying signal $S_{phase}$ and the sensing signal $S_{sense}$ is the phase shift value $Val_{phase}$. The driving module 33 judges whether the motor 2 has reached a predetermined rotating speed according to the value of the phase modifying signal $S_{phase}$, and modifies the driving current $S_{drive}$ to drive the motor 2 according to the judgment.

Figure 6:
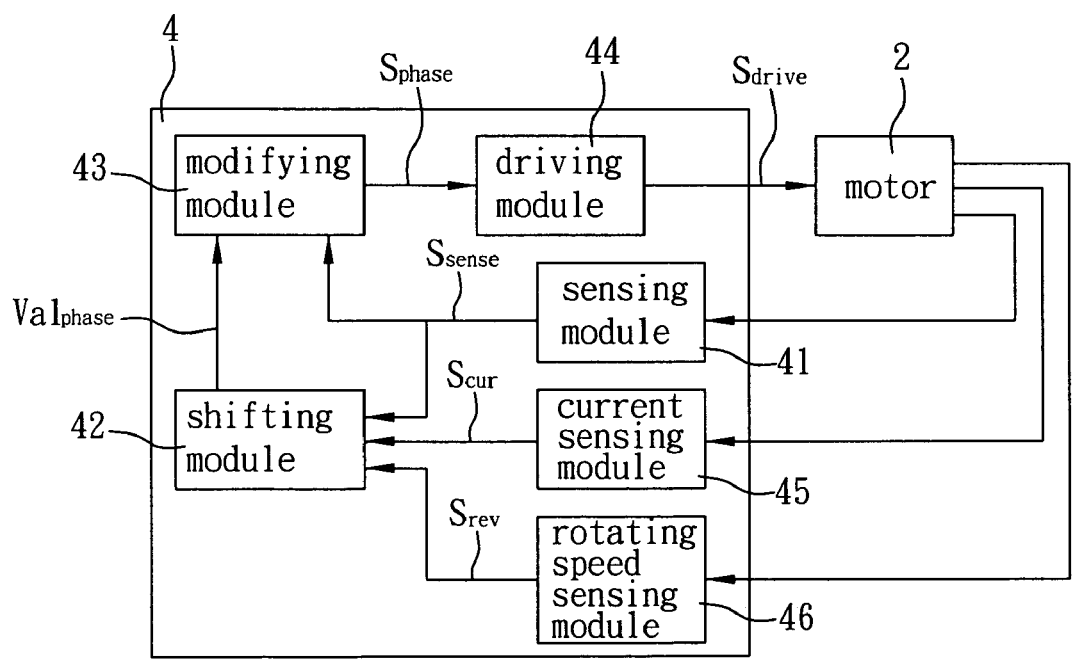
FIG. 6 is a block diagram showing another control device of the motor according to another embodiment of the invention.

Referring to FIG. 6, a control device 4 of another embodiment includes a sensing module 41, a shifting module 42, a modifying module 43 and a driving module 44.

The sensing module 41 senses a position of a magnetic pole of the motor 2 to generate a sensing signal $S_{sense}$. The shifting module 42 generates a phase shift value $Val_{phase}$. The modifying module 43 receives the sensing signal $S_{sense}$ and the phase shift value $Val_{phase}$, and generates a phase modifying signal $S_{phase}$ according to the sensing signal $S_{sense}$ and the phase shift value $Val_{phase}$. The driving module 44 receives the phase modifying signal $S_{phase}$ and generates a driving current $S_{drive}$ to drive the motor 2 according to the phase modifying signal $S_{phase}$.

The modifying module 43 and the driving module 44 may be integrated in a controller, which may directly calculate the modified phase value corresponding to the sensing signal $S_{sense}$ to generate the phase modifying signal $S_{phase}$. The controller can generate the driving current $S_{drive}$, which is required when the motor 2 is rotating at the rotating speed, according to the phase modifying signal $S_{phase}$.

In addition, the control device 4 further includes a current sensing module 45 and a rotating speed sensing module 46. The current sensing module 45 senses an operating current of the motor 2 to generate a current sensing signal $S_{cur}$. The rotating speed sensing module 46 senses a rotating speed of the motor 2 to generate a rotating speed sensing signal $S_{rev}$. Furthermore, the sensing module 41 may include a Hall element for sensing the position of the magnetic pole of the motor 2 and generating the sensing signal $S_{sense}$.

The shifting module 42 can receive the sensing signal $S_{sense}$, the current sensing signal $S_{cur}$ or the rotating speed sensing signal $S_{rev}$ to obtain the actual rotating speed of the motor 2 or the actual operating current of the motor 2. The shifting module 42 also generates the phase shift value $Val_{phase}$ according to the sensing signal $S_{sense}$, the current sensing signal $S_{cur}$ or the rotating speed sensing signal $S_{rev}$. The modifying module 43 generates the phase modifying signal $S_{phase}$ according to the phase shift value $Val_{phase}$.

In this embodiment, the shifting module 42, the modifying module 43 and the driving module 44 may be integrated in a controller, which calculates the phase shift value $Val_{phase}$ in a digital operation manner.

In addition, the shifting module 42 may include a rotating speed look-up table for recording the phase shift value $Val_{phase}$ corresponding to each rotating speed of the motor 2.

Consequently, the shifting module 42 can generate a properly corresponding phase shift value $Val_{phase}$ according to the rotating speed of the motor 2, such that the driving module 44 can generate a proper driving current $S_{drive}$ and the surge can be reduced when the driving current $S_{drive}$ is changing its phase.

In this embodiment, the shifting module 42 can verify whether the phase shift value $Val_{phase}$ can indeed response with the rotating speed of the motor according to the current sensing signal $S_{cur}$ or the rotating speed sensing signal $S_{rev}$, such that the modifying module 43 can generate the phase modifying signal $S_{phase}$ in the correct phase.

In addition, the shifting module 42 can estimate the rotating speed of the motor according to the sensing signal $S_{sense}$, the current sensing signal $S_{cur}$ or the rotating speed sensing signal $S_{rev}$, and selects one phase shift value $Val_{phase}$ corresponding to the rotating speed from the rotating speed look-up table.

Herein, the controller may be a programmable chip, an integrated circuit, a processor, a digital signal processor or a micro-controller. The shifting module 42, the modifying module 43 and the driving module 44 may be firmware program codes.

In this embodiment, the shifting module 42 may include a table or an equation corresponding to a relationship between the sensing signal $S_{sense}$, the current sensing signal $S_{cur}$, the rotating speed sensing signal $S_{rev}$ and the phase shift value $Val_{phase}$. Thus, when the shifting module 42 is operating, the phase shift value $Val_{phase}$ can be derived from the table or equation. The phase shift value $Val_{phase}$ may be an angle between a position, at which the sensing module 41 is placed in the motor, and an optimum sensing position corresponding to the rotating speed. In this case, the angle is, for example, the arc angle between the positions $P_1$ and $P_2$ in FIG. 1.

Figure 7:
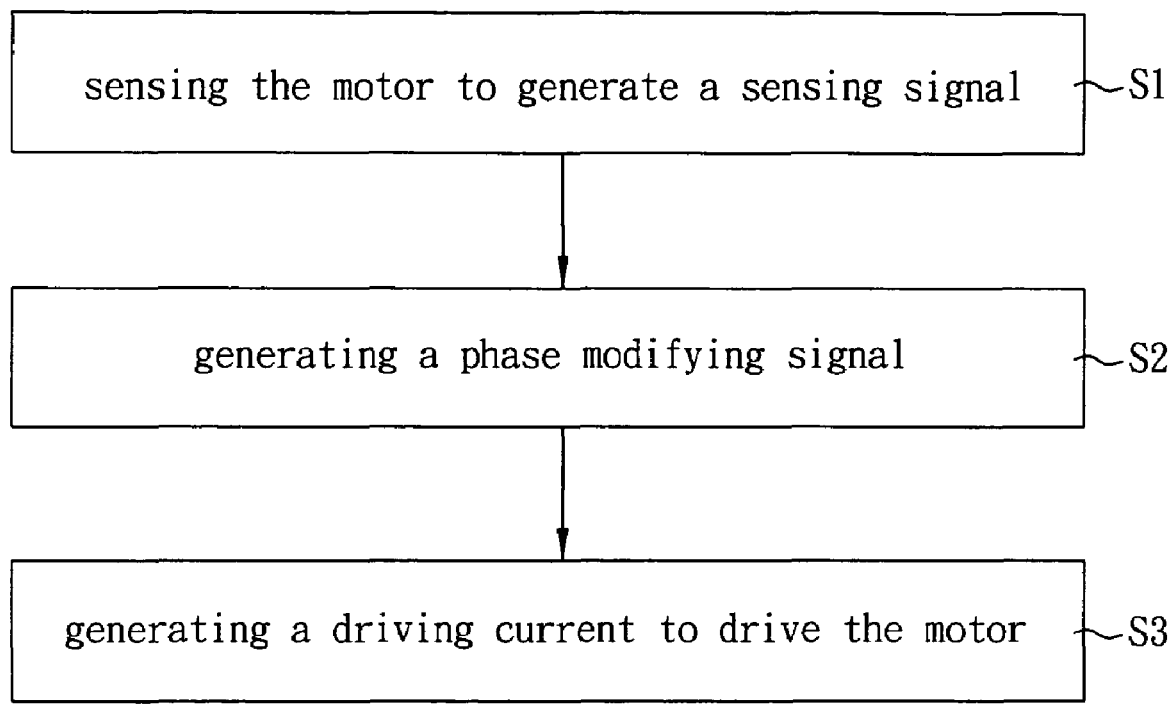
FIG. 7 is a flow chart showing a control method of the motor according to the preferred embodiment of the invention.

Referring to FIG. 7, the method of controlling a motor according to the preferred embodiment of the invention includes steps S1 to S3.

Step S1 senses a position of a magnetic pole of the motor, an operating current and/or a rotating speed, to generate a sensing signal. Step S2 generates a phase modifying signal according to the sensing signal. Step S3 generates a driving current to drive the motor according to the phase modifying signal.

Because the method of controlling the motor in this embodiment can be implemented in the control devices 3 and 4 of the motor of FIGS. 3 to 6, the possible methods and effects have been discussed hereinabove. Thus, the detailed descriptions thereof will be omitted for concise purpose.

In summary, the motor control device and method of the invention generate a phase modifying signal according to the sensing signal and generate a driving current to drive the motor according to the phase modifying signal. Therefore, when the rotating speed of the motor changes, the device and method can response with the influence of the placing position of the sensor, and response with the rotating speed to generate a proper motor driving current so as to enhance the working efficiency, lengthen the lifetime of the motor and reduce the noise generated when the motor is operating.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A control device for controlling a motor, comprising:
a sensing module for sensing the motor to generate a sensing signal;
a modifying module for receiving the sensing signal and generating a phase modifying signal according to the sensing signal;
a driving module for receiving the phase modifying signal and generating a driving current to drive the motor according to the phase modifying signal; and
a shifting module for receiving the sensing signal, generating a phase shift value according to the sensing signal and transmitting the phase shift value to the modifying module such that the modifying module generates the phase modifying signal according to the sensing signal and the phase shift value.

2. The control device according to claim 1, wherein the sensing module comprises:
a Hall element for sensing a position of a magnetic pole of the motor to generate the sensing signal.

3. The control device according to claim 1, wherein the sensing module senses an operating current or a rotating speed of the motor to generate the sensing signal.

4. The control device according to claim 1, wherein a phase difference between the phase modifying signal and the sensing signal is equal to a phase difference represented by the phase shift value.

5. The control device according to claim 1, wherein the modifying module, the driving module, and the shifting module are integrated in a controller.

6. The control device according to claim 5, wherein the controller is a programmable chip, an integrated circuit, a processor, a digital signal processor or a micro-controller 7. The control device according to claim 5, wherein the shifting module, the modifying module, and the driving module are firmware program codes.

8. The control device according to claim 7, wherein the shifting module comprises a table or an equation representing a corresponding relationship between the sensing signal and the phase shift value.

9. The control device according to claim 1, wherein the phase shift value is an angle between a position of the sensing module disposed in the motor and an optimum sensing position corresponding to a rotating speed of the motor.

10. The control device according to claim 1, wherein the shifting module includes a rotating speed look-up table for recording the phase shift value corresponding to each rotating speed of the motor.

11. The control device according to claim 1, wherein the modifying module and the driving module are integrated in a controller.

12. The control device according to claim 11, wherein the controller is a programmable chip, an integrated circuit, a processor, a digital signal processor or a micro-controller 13. The control device according to claim 11, wherein the modifying module and the driving module are firmware program codes.

14. The control device according to claim 1, further comprising:
a current sensing module for sensing an operating current of the motor to generate a current sensing signal; and
a rotating speed sensing module for sensing a rotating speed of the motor to generate a rotating speed sensing signal.

15. A method for controlling a motor, the method comprising the steps of:

sensing the motor to generate a sensing signal;

generating a phase modifying signal according to the sensing signal;

generating a driving current to drive the motor according to the phase modifying signal; and generating a phase shift value according to the sensing signal such that the phase modifying signal is generated according to the sensing signal and the phase shift value.

16. The method according to claim 15, wherein the step of sensing the motor is to sense a position of a magnetic pole, an operating current or a rotating speed of the motor to generate the sensing signal.

17. The method according to claim 15, wherein a phase difference between the phase modifying signal and the sensing signal is equal to a phase difference represented by the phase shift value.

* * * * *